United States Patent
Nakata et al.

(10) Patent No.: US 8,307,842 B2
(45) Date of Patent: Nov. 13, 2012

(54) FLUID SUPPLY VALVE ATTACHMENT DEVICE

(75) Inventors: Tomoshi Nakata, Kariya (JP);
Motoyasu Yamamori, Nagoya (JP);
Toshikatsu Kubo, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 622 days.

(21) Appl. No.: 12/468,446

(22) Filed: May 19, 2009

(65) Prior Publication Data
US 2009/0283165 A1 Nov. 19, 2009

(30) Foreign Application Priority Data
May 19, 2008 (JP) .................. 2008-130930

(51) Int. Cl.
*F16K 43/00* (2006.01)
*F16K 51/00* (2006.01)

(52) U.S. Cl. ............... 137/315.03; 137/320; 137/15.17; 251/129.15

(58) Field of Classification Search ............... 137/15.18, 137/15.17, 315.03, 320; 251/129.15, 144
See application file for complete search history.

(56) References Cited

U.S. PATENT DOCUMENTS

| 4,540,154 A | * | 9/1985 | Kolchinsky et al. ...... 251/129.15 |
| 5,197,710 A | * | 3/1993 | Wass et al. ............... 251/129.15 |
| 5,452,738 A | * | 9/1995 | Borland et al. ............... 137/265 |

FOREIGN PATENT DOCUMENTS

| JP | 2005-23975 | 1/2005 |
| JP | 2007-127215 A | 5/2007 |
| JP | 2008-8402 A | 1/2008 |

OTHER PUBLICATIONS

Office Action issued Apr. 17, 2012, in Japanese Patent Application No. 2008-130930 with English translation.

* cited by examiner

*Primary Examiner* — Dinh Q Nguyen
(74) *Attorney, Agent, or Firm* — Oblon, Spivak, McClelland, Maier & Neustadt, L.L.P.

(57) ABSTRACT

A fluid supply valve attachment device that includes: a fixing member formed with a recessed fitting section; and a fluid supply valve provided with a protruded insertion section that is inserted and fixed in the recessed fitting section. Clearance between a reference inner peripheral surface of the recessed fitting section and a reference outer peripheral surface of the protruded insertion section is set smaller than clearance between an internal thread of the recessed fitting section and an external thread of the protruded insertion section in a state that the protruded insertion section is inserted and fixed in the recessed fitting section.

14 Claims, 7 Drawing Sheets

FLUID SUPPLY VALVE ATTACHMENT DEVICE

INCORPORATION BY REFERENCE

The disclosure of Japanese Patent Application No. 2008-130930 filed on May 19, 2008 including the specification, drawings and abstract is incorporated herein by reference in its entirety.

BACKGROUND OF THE INVENTION

1. Field of the Invention

The present invention relates to a fluid supply valve attachment device that attaches a fluid supply valve to a fixing member in a stationary manner.

2. Description of the Related Art

A fluid supply valve attachment device that attaches a fluid supply valve to a fixing member in a stationary manner is conventionally known (Japanese Patent Application Publication No. 2005-23975 (JP-A-2005-23975)). The fixing member that attaches the fluid supply valve in a stationary manner has: a first passage through which fluid passes; a recessed fitting section; an internal thread formed in the inner periphery of the recessed fitting section; a reference inner peripheral surface in the shape of a cylinder; and a ring-shaped stopper surface that is radially extended. The fluid supply valve has: a second passage that can communicate with the first passage; a valve body capable of opening/closing the second passage; and a protruded insertion section that is inserted in and attached to the recessed fitting section of the fixing member. The protruded insertion section has a cylindrically-shaped reference outer peripheral surface that is fitted to and restrained by the reference inner peripheral surface of the recessed fitting section.

According to the above device, in order to attach the fluid supply valve to the fixing member, an external thread is threaded into the internal thread while the reference outer peripheral surface of the protruded insertion section is fitted to and restrained by the reference inner peripheral surface of the recessed fitting section. Accordingly, the protruded insertion section of the fluid supply valve is radially positioned and then fitted to the recessed fitting section of the fixing member. In this case, "scoring" may occur between the reference outer peripheral surface of the protruded insertion section and the reference inner peripheral surface of the recessed fitting section.

In addition, in a field that requires air tightness, the above-mentioned "scoring" tends to occur when clearance between the reference outer peripheral surface of the protruded insertion section and the reference inner peripheral surface of the recessed fitting section and clearance between the internal thread and the external thread are designed to be as small as possible.

For the above reason, according to the above-mentioned JP-A-2005-23975, the protruded insertion section is divided into two parts: one is a first part with the reference outer peripheral surface, and the other is a second part with the external thread. The first and second parts are adopted to be radially and independently displaceable. However, the division of the protruded insertion section into the two parts increases the number of parts, thereby complicating the manufacturing process.

SUMMARY OF THE INVENTION

An object of the present invention is to provide a fluid supply valve attachment device that facilitates prevention of "scoring" between a reference outer peripheral surface of a protruded insertion section and a reference inner peripheral surface of a recessed fitting section when attaching a fluid supply valve to a fixing member in a stationary manner upon elimination of a measure to divide the protruded insertion section into two parts.

A fluid supply valve attachment device according to an embodiment of the present invention includes (i) a fixing member that has: a first passage through which fluid passes; a recessed fitting section that is provided with a bottom surface at one end in an axial direction; an internal thread that is formed in the inner periphery of the recessed fitting section; and a reference inner peripheral surface that is formed between the internal thread and the bottom surface in the inner periphery of the recessed fitting section, and (ii) a fluid supply valve that has: a second passage whose one end communicates with the first passage of the fixing member and whose other end communicates with a fuel supply source; a valve body that opens or closes the second passage; a protruded insertion section that is inserted in and fitted to the recessed fitting section; an external thread that is provided on the protruded insertion section and threaded into the internal thread of the recessed fitting section; and a reference outer peripheral surface that is fitted to the reference inner peripheral surface of the fixing member, in which (iii) clearance between the reference outer peripheral surface and the reference inner peripheral surface when the reference outer peripheral surface is fitted to the reference inner peripheral surface is set smaller than clearance between the external thread and the internal thread when the external thread is threaded into the internal thread. The fluid supply valve may be of any type as long as it has a valve body that can open and close the second passage, and may be an on-off valve, a flow control valve, a pressure control valve, a solenoid valve, or a hand operated valve.

In the fluid supply valve attachment device according to the embodiment of the present invention, while the reference outer peripheral surface of the protruded insertion section of the fluid supply valve is radially restrained by the reference inner peripheral surface of the recessed fitting section of the fixing member, the external thread of the protruded insertion section of the fluid supply valve is threaded into the internal thread of the recessed fitting section. Accordingly, the protruded insertion section of the fluid supply valve is fitted to the recessed fitting section of the fixing member in a state that the protruded insertion section is radially positioned.

When the protruded insertion section of the fluid supply valve is fitted to the recessed fitting section of the fixing member as described above, the reference outer peripheral surface of the protruded insertion section is abutted on and restrained by the reference inner peripheral surface of the recessed fitting section, and thus the position of the protruded insertion section of the fluid supply valve is restrained in the radial direction (first restraint state). In addition, when the external thread of the protruded insertion section is threaded into the internal thread of the recessed fitting section, the position of the protruded insertion section of the fluid supply valve is restrained in the radial direction (second restraint state). If the second restraint state is prioritized over the first restraint state, the threading of the external thread into the internal thread is prioritized. Thus, this may cause "scoring" between the reference outer peripheral surface of a shaft portion of the protruded insertion section and the reference inner peripheral surface of the recessed fitting section. Furthermore, when the recessed fitting section and the protruded insertion section are made of relatively soft metal such as aluminum alloy and stainless steel, there is possible occurrence of "scoring".

Considering the above problems, according to the embodiment of the present invention, the clearance between the reference outer peripheral surface and the reference inner peripheral surface when the reference outer peripheral surface is fitted to the reference inner peripheral surface is set smaller than the clearance between the external thread and the internal thread when the external thread is threaded into the internal thread. Therefore, the first restraint state is prioritized over the second restraint state. Consequently, the reference outer peripheral surface of the protruded insertion section is preferentially abutted on the reference inner peripheral surface of the recessed fitting section, and thus the position of the protruded insertion section of the fluid supply valve is restrained in the radial direction. Therefore, the above-mentioned "scoring" is prevented. Furthermore, even when the recessed fitting section and the protruded insertion section are made of relatively soft metal such as aluminum alloy and stainless steel, "scoring" can be prevented.

The following aspect may be adopted in the above embodiment.

The radial clearance formed between the reference inner peripheral surface and the reference outer peripheral surface is set as a1 micrometer, and the radial clearance formed between the internal thread and the external thread is set as a2 micrometer. In addition, offset of an axis of the external thread with respect to an axis of the reference outer peripheral surface in the radial direction is set as β micrometer. In the above condition, the following equations may be satisfied.

$$0.5 \times a1 + 0.5 \times a2 > \beta \quad (1),$$

$$a2 > (2\beta - a1) \quad (2),$$

$$a2 > \{(2\beta - a1) \times N\} \quad (3)$$

(where N is any value equal to or greater than 1.00), and it is exemplified that N=1.00 to 3.00. As N increases, the clearance a2 that is formed between the external thread and the internal thread becomes large, and the first restraint state tends to be prioritized over the second restraint state.

Although it depends on a nominal diameter and the like of the external thread, a1 is exemplified to be 16 to 45 micrometers, 20 to 200 micrometers, 77 to 261 micrometers, etc. when the nominal diameter of the external thread is 0.99 to 355 mm. a2 is exemplified to be 6 to 1,840 micrometers, 50 to 1,000 micrometers, or 104 to 304 micrometers. The nominal diameter is a diameter that represents the dimension of a thread, and a basic dimension of an outside diameter of the external thread is used as the nominal diameter (Japan Industrial Standards (JIS) Handbook Fasteners and Screw Threads I-2007).

In the above embodiment, a tapered portion whose outer diameter is reduced as it approaches a tip thereof may be formed at the distal end of the protruded insertion section of the fluid supply valve. Furthermore, in a cross section along the axis of the protruded insertion section, a part of the tapered portion with the largest outer diameter may be a rounded part. Accordingly, the reference outer peripheral surface of the protruded insertion section can be abutted gently on the reference inner peripheral surface of the recessed fitting section in the radial direction. In other words, it is possible to prevent damages from occurring when the protruded insertion section is inserted into the recessed fitting section.

In the above embodiment, in the cross section along the axis of the protruded insertion section, an angle between an inclined surface of the tapered portion and an imaginary line that is in parallel with the axis of the protruded insertion section and extends from the reference outer peripheral surface to the bottom surface of the recessed fitting section is defined as an inclined angle. A part of the inclined surface of the tapered portion with a small diameter is defined as a start point, and a part thereof with a large diameter is defined as a termination point. At this time, the inclined angle at the start point of the inclined surface of the tapered portion may be set larger than the inclined angle at the termination point of the inclined surface of the tapered portion. Accordingly, when the protruded insertion section enters relatively and deeply into the recessed fitting section, the reference outer peripheral surface of the protruded insertion section can be abutted gently on the reference inner peripheral surface of the recessed fitting section in the radial direction. In other words, it is possible to prevent damages from occurring when the protruded insertion section is inserted into the recessed fitting section.

In the above embodiment, the inclined surface may include a first inclined surface that is provided in a part near the start point and a second inclined surface that is provided in a part near the termination point.

In the above embodiment, the fixing member may be mounted to a tank that has a tank chamber to store fluid such as gas and liquid. Therefore, the gas can be high-pressure gas. The gas can be hydrogen gas or hydrogen-containing gas. The pressure of the gas that is stored in the tank chamber is exemplified to be 5 MPa to 200 Mpa for example. However, the pressure of the gas is not limited within the above range.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

A first embodiment of the present invention will be described with reference to FIG. 1 to FIG. 7. As shown in FIG.

Figure 2:
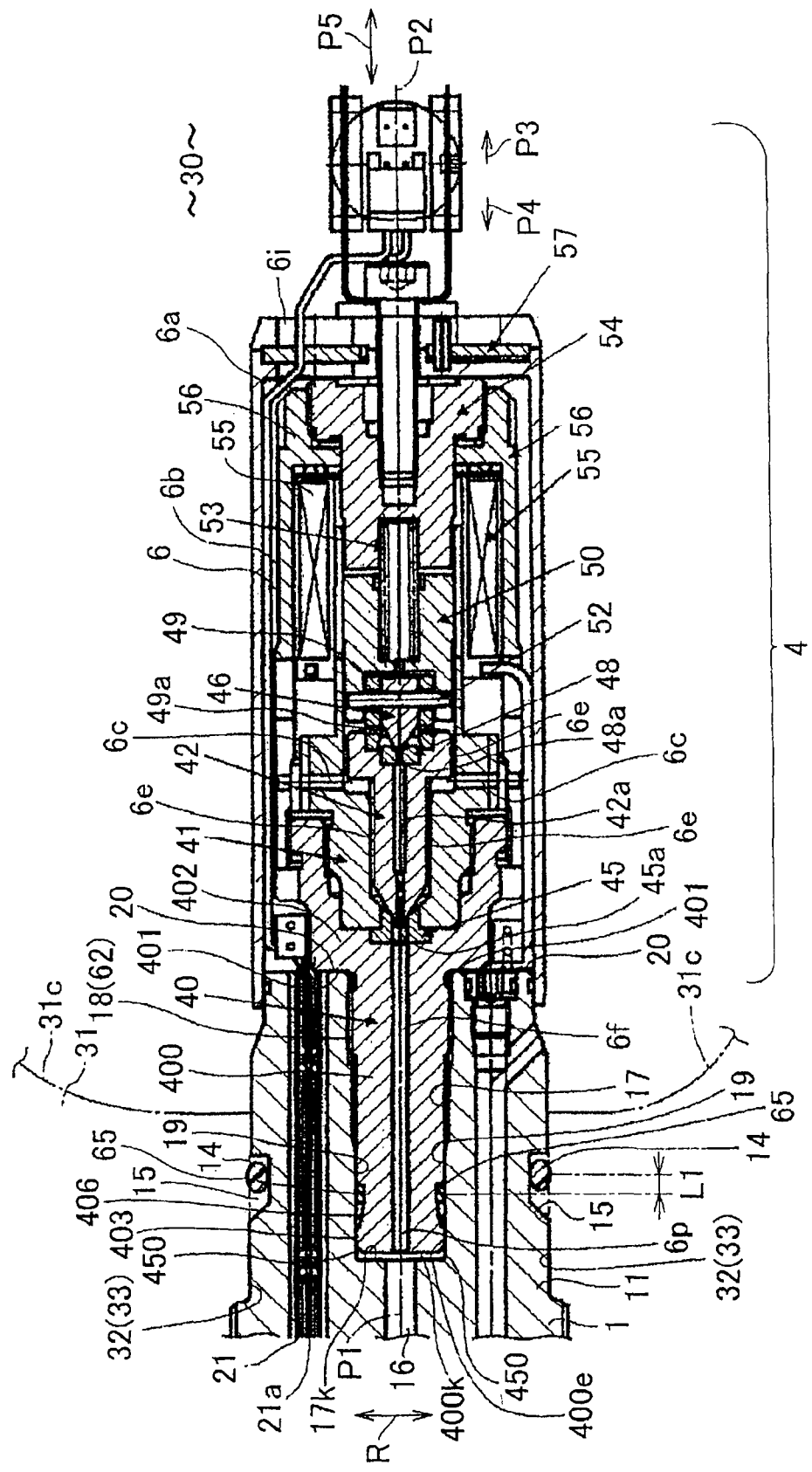
FIG. 2 is an enlarged partial sectional view showing the state where the fluid supply valve is attached to the fixing member of the tank that stores high-pressure gas.

1 and FIG. 2, a fluid supply valve attachment device has a fixing member 1 and a fluid supply valve 4 that is removably attached to the fixing member 1.

Figure 1:
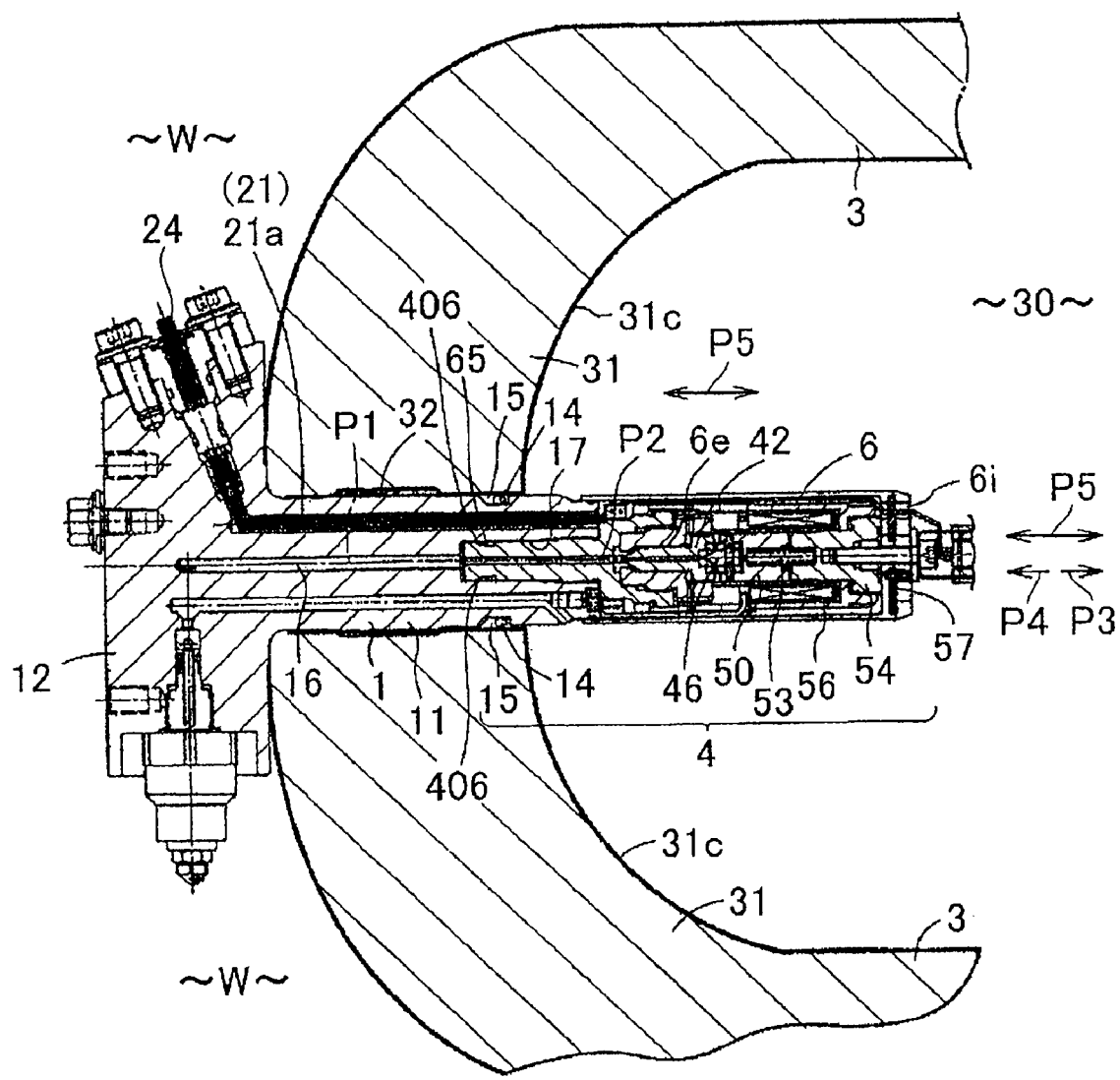
FIG. 1 is a cross-sectional view showing a state according to a first embodiment where a fluid supply valve is attached to a fixing member of a tank that stores high-pressure gas.

As shown in FIG. 1, the fixing member 1 is mounted in a mounting hole 32 in a tank wall 31 having an inner wall surface 31c that forms a tank chamber 30 of a tank 3 to store gas (hydrogen gas) at high pressure. The high-pressure gas (hydrogen gas) is stored in the tank chamber 30. The pressure in the tank chamber 30 is higher than atmospheric pressure and generally within a range of 10 to 250 MPa, 20 to 150 Mpa, or 40 to 100 MPa. However, the pressure in the tank chamber 30 is not limited within the above ranges.

The fixing member 1 fixes the fluid supply valve 4 to the tank 3 and has a shaft-shaped first section 11 that is mounted in the mounting hole 32 in the tank wall 31 and a flange-shaped second section 12 that is connected to the first section 11 and exposed to the ambient atmosphere outside the tank 3. The second section 12 has a connector 24 (hermetic connector) that holds an electric wire to energize the fluid supply valve 4.

As shown in FIG. 1, a ring-shaped first sealing member 14 that is formed of a sealing material is disposed between the outer periphery of the first section 11 of the fixing member 1 and the inner periphery of the mounting hole 32 in the tank wall 31. The first sealing member 14 is arranged in a ring-shaped first sealing groove 15 that is coaxially formed in the outer periphery of the first section 11 of the fixing member 1, and seals a space between the outer periphery of the fixing member 1 and the inner periphery of the mounting hole 32 of the tank 3 in an airtight manner.

As shown in FIG. 1, a first passage 16 is formed in the axial direction at the center of the first section 11 of the fixing member 1. The gaseous (hydrogen gas) fluid passes through the first passage 16 and is supplied to a stack of fuel cells. A pressure reducing valve (not shown) is provided between an exit of the first passage 16 in the fixing member 1 and an anode (fuel electrode) of the stack of fuel cells.

As shown in FIG. 2, the fixing member 1 has a recessed fitting section 17 that is formed into a cylinder with a recess. The recessed fitting section 17 is coaxially formed in the first section 11 of the fixing member 1 and opens toward the tank chamber 30. The inner periphery of the recessed fitting section 17 has: an internal thread 18; and a cylindrically-shaped reference inner peripheral surface 19 that is formed at the back of the internal thread 18 in the axial direction (in a direction away from the tank chamber 30 in the tank 3) and extended along the axial direction (along an axis P1 of the fixing member 1). The reference inner peripheral surface 19 and the internal thread 18 in the recessed fitting section 17 are coaxially arranged with respect to the axis P1 of the fixing member 1.

A ring-shaped stopper surface 20 that extends outwardly in a radial direction of the fixing member 1 (in the arrow R direction) is formed in the fixing member 1. The stopper surface 20 is an end of the fixing member 1 on the tank chamber 30 side. In addition, the fixing member 1 is provided with a wire hole 21 through which an electric wire 21a passes.

As shown in FIG. 2, the fuel supply valve 4 is a solenoid valve that includes: a cylindrically-shaped protruded insertion section 40 that is inserted in and removably attached to the recessed fitting section 17 of the fixing member 1; a tube-shaped plug 41 that is partially fitted to the protruded insertion section 40; a main poppet 42 that is partially fitted to the plug 41 and functions as a tube-shaped valve body with a pilot passage 42a; a main seat 45 in which a tip of the main poppet 42 can be seated and that has a main port 45a; a tube-shaped pilot poppet 46; a pilot seat 48 in which a tip of the pilot poppet 46 can be seated and that has a pilot port 48a; a sub plug 49 having a through hole 49a that radially extends through the sub plug 49; a tube-shaped plunger 50; a pin 52 that connects the plunger 50, the pilot poppet 46, and the sub plug 49; a spring 53 that urges the plunger 50 in a direction to close the valve (in the arrow P4 direction); a tube-shaped stopper 54; a tube-shaped excited coil 55 that is disposed on the radially outer side of the stopper 54 and the plunger 50; a yoke 56 that forms a magnetic circuit when the excited coil 55 is excited; and a filter 57 for dust removal that faces the tank chamber 30.

The protruded insertion section 40 of the fluid supply valve 4 has an axis P2 that is coincident with the axis P1 of the fixing member 1. When the excited coil 55 is not energized, the plunger 50 is urged in the direction to close the valve (the arrow P4 direction) by the urging force of the spring 53, and the pilot poppet 46 is also urged in the direction to close the valve (the arrow P4 direction) via the pin 52 so as to close the pilot port 48a of the pilot seat 48. Furthermore, the main poppet 42 is urged in the direction to close the valve (the arrow P4 direction) so as to close the main port 45a of the main seat 45.

As shown in FIG. 2, a second passage 6 is formed in the fuel supply valve 4 to guide the gas in the tank chamber 30 of the tank 3 to the first passage 16. An exit 6p, which is an end of the second passage 6, is coaxially formed in the protruded insertion section 40 and can communicate with the first passage 16 in the fixing member 1. An entry 6i, which is the other end of the second passage 6, faces the tank chamber 30 in the tank 3 as a fluid supply source. More specifically, the second passage 6 includes: a passage 6a that communicates with the tank chamber 30 in the tank 3 via the entry 6i; a passage 6b that is provided on the outer peripheral side of the yoke 56; a passage 6c that is provided in the plug 41 and radially extends through the plug 41; a passage 6e that is formed on the outer periphery of the main poppet 42; the main port 45a that is formed in the main seat 45; and a passage 6f that is formed in the center of the protruded insertion section 40.

In this embodiment, in order to open the fuel supply valve 4, the excited coil 55 is energized for excitation, causing the formation of the magnetic circuit that passes through the yoke 56. The plunger 50 then moves in a direction to open the valve (the arrow P3 direction) against the urging force of the spring 53. Then, the pilot poppet 46 moves in the direction to open the valve (the arrow P3 direction) via the pin 52, and the pilot port 48a of the pilot seat 48 is opened. Following the above, the high-pressure gas in the tank chamber 30 flows through the passage 49a of the sub plug 49, the pilot port 48a, the pilot passage 42a of the main poppet 42, and the main port 45a of the main seat 45 to the first passage 16 of the fixing member 1. At this time, the differential pressure between pressure that urges the main poppet 42 in the direction to close the valve (the arrow P4 direction) and pressure that urges the main poppet 42 in the direction to open the valve (the arrow P3 direction) decreases. Accordingly, the main poppet 42 moves in the direction to open the valve (the arrow P3 direction), causing to open the main port 45a of the main seat 45. Consequently, the high-pressure gas in the tank chamber 30 flows through the passages 6b, 6c, and 6e and the main port 45a of the main seat 45 to the passage 6f in the protruded insertion section 40, further flows into the first passage 16 in the fixing member 1, and further flows into the anode (fuel electrode) side of the stack of fuel cells via the pressure reducing valve (not shown). In order to close the fuel supply valve 4, it is only needed to shut off current supply to the excited coil 55.

Figure 3:
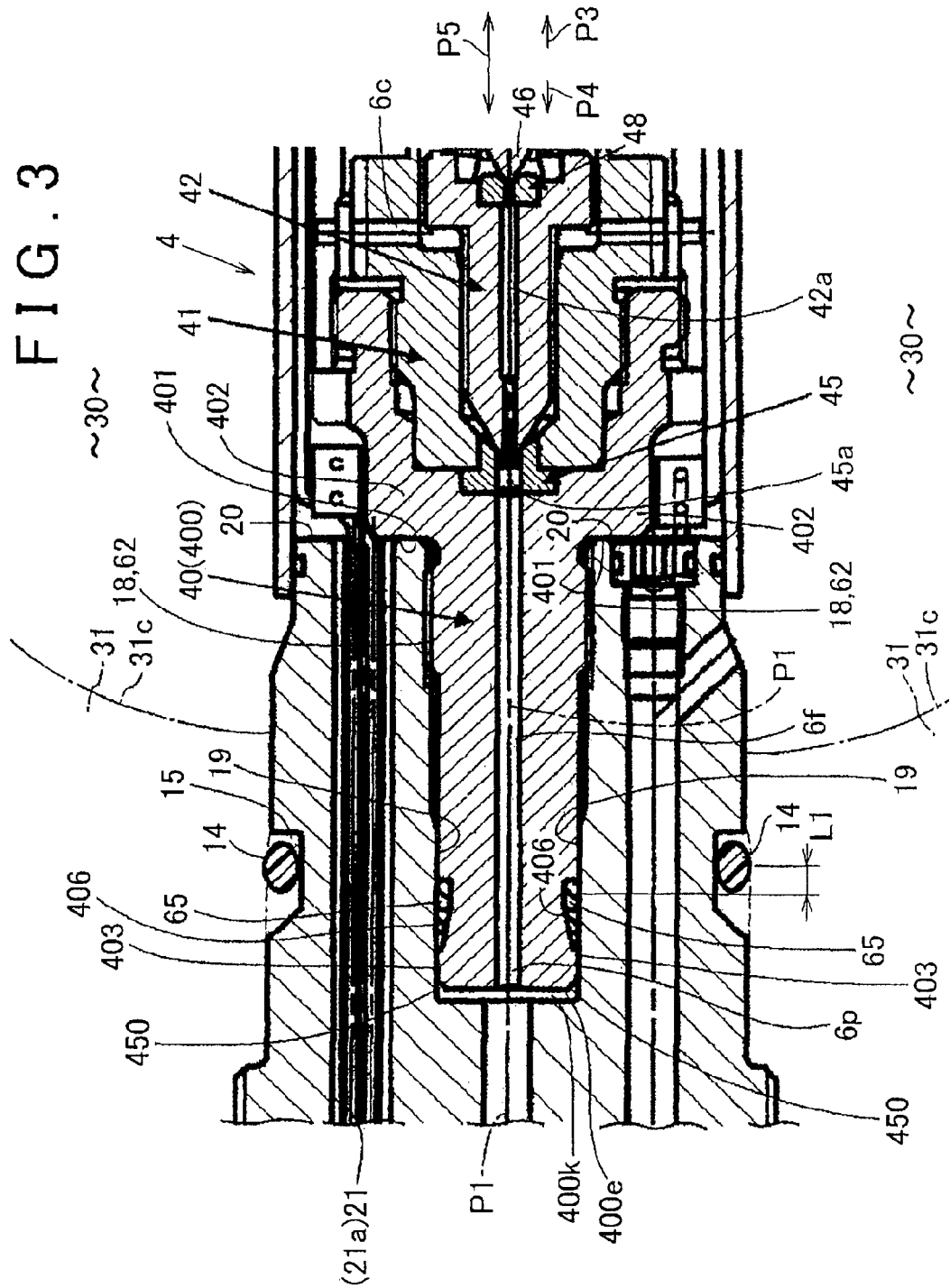
FIG. 3 is a further enlarged partial sectional view showing the state where the fluid supply valve is attached to the fixing member of the tank that stores high-pressure gas.

As shown in FIG. 2 and FIG. 3, the protruded insertion section 40 coaxially includes: a cylindrical shaft portion 400 having an external thread 62 on its outer periphery that is threaded into the internal thread 18 of the recessed fitting section 17; a flange portion 402 that is connected to an end of the shaft portion 400 on the tank chamber 30 side, and has a ring-shaped abutment surface 401 extending radially; a tapered portion 450 that is formed on the other end of the shaft portion 400 that is away from the tank chamber 30.

As shown in FIG. 2 and FIG. 3, the shaft portion 400 coaxially includes: the external thread 62 that is threaded into the internal thread 18; and a cylindrically-shaped reference outer peripheral surface 403 that is formed at the back of the external thread 62 in the axial direction, that is, on a side away from the tank chamber 30. The reference outer peripheral surface 403 is in the cylindrical shape and is formed between the tapered portion 450 and the external thread 62 in an extending direction P5 as a direction in which the protruded insertion section 40 extends. When the external thread 62 is threaded into the internal thread 18, the protruded insertion section 40 moves in a direction away from the tank chamber 30 (the arrow P4 direction). Consequently, the abutment surface 401 of the flange portion 402 of the protruded insertion section 40 abuts on the stopper surface 20 of the fixing member 1. Therefore, the protruded insertion section 40 is positioned in the extending direction P5.

Figure 6:
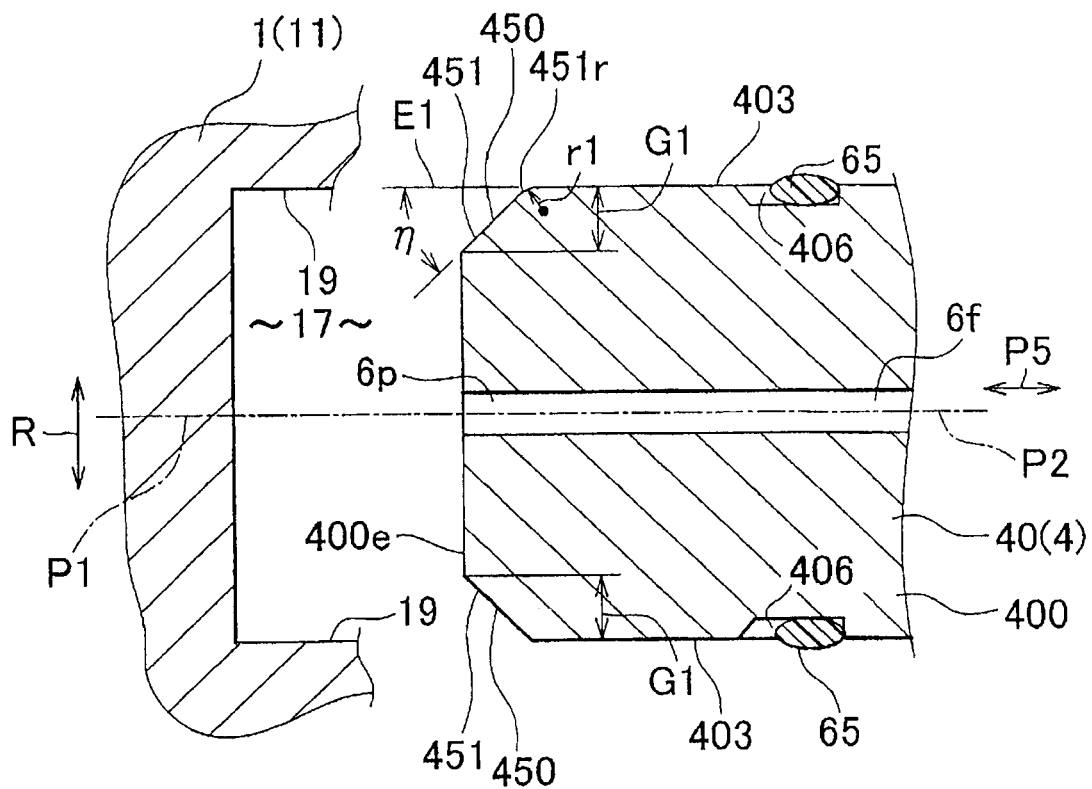
FIG. 6 is an enlarged cross-sectional view of a vicinity of a tapered portion of the protruded insertion section.

FIG. 6 shows a vicinity of the tapered portion 450. As shown in FIG. 6, the tapered portion 450 has an inclined surface 451 that circles around the axis P2 of the protruded insertion section 40. The inclined surface 451 has a conical surface whose diameter becomes smaller as it approaches an end surface 400e on the end of the shaft portion 400 that is away from the tank chamber 30. The tapered portion 450 is formed by chamfering a peripheral edge of the end face of the protruded insertion section 40.

The nominal diameter of the external thread 62 (a metric thread) of the protruded insertion section 40 of the fluid supply valve 4 is set to be 14 mm. The outside diameter of the external thread 62 (a diameter of an imaginary cylinder that contacts the top edge of the external thread 62) is 14 mm, and the pitch thereof is set to be 1 mm. The root diameter of the external thread 62 of the protruded insertion section 40 of the fluid supply valve 4 (a diameter of an imaginary cylinder that contacts the root of the external thread 62) is 12.917 mm, and the pitch diameter thereof is 13.35 mm. The pitch diameter means a diameter of an imaginary cylinder in which the groove width of the internal thread 18 equals the thread ridge width of the external thread 62. The nominal diameter, the pitch, and the pitch diameter are not limited to the above values and can be changed as necessary.

According to this embodiment, clearance a2 that is formed between the internal thread 18 of the recessed fitting section 17 and the external thread 62 of the protruded insertion section 40 is set to be the maximum or nearly maximum value within a range of allowable clearance widths defined by Japan Industrial Standards (JIS). More specifically, the clearance a2 between the internal thread 18 of the recessed fitting section 17 and the external thread 62 of the protruded insertion section 40 (see FIG. 4) is set to be larger than 60 micrometers. Furthermore, it is preferable that the clearance a2 be set equal to or larger than 90 micrometers or 100 micrometers. The upper limit of the clearance a2 between the internal thread 18 of the recessed fitting section 17 and the external thread 62 of the protruded insertion section 40 can be 400 micrometers or 500 micrometers. In the related art, the clearance a2 between the internal thread 18 and the external thread 62 is set to be approximately 26 micrometers. As described above, the external thread 62 is loosely threaded into the internal thread 18 in this embodiment.

Next, a description will be made of attachment of the fluid supply valve 4 to the fixing member 1 that is attached to the tank 3. In this case, the fluid supply valve 4 is arranged on the tank chamber 30 side in a manner that the axis P1 of the fixing member 1 is nearly aligned with the axis P2 of the protruded insertion section 40. Then, the protruded insertion section 40 of the fluid supply valve 4 faces the recessed fitting section 17 of the fixing member 1. In this state, the fuel supply valve 4 is rotated together with the protruded insertion section 40 about the axis P1 with respect to the recessed fitting section 17 of the fixing member 1. This causes the external thread 62 of the protruded insertion section 40 of the fuel supply valve 4 to be threaded into the internal thread 18 of the recessed fitting section 17 of the fixing member 1. When the abutment surface 401 of the flange portion 402 of the protruded insertion section 40 abuts on the stopper surface 20 of the fixing member 1, the positioning of the protruded insertion section 40 of the fluid supply valve 4 in the extending direction P5 is completed. At this time, as shown in FIG. 2 and FIG. 3, clearance 400k is formed between the end surface 400e of the protruded insertion section 40 and a bottom surface 171 of the recessed fitting section 17. In other words, the protruded insertion section 40 is not axially positioned by abutting the end surface 400e of the shaft portion 400 of the protruded insertion section 40 on the bottom surface 171 of the recessed fitting section 17. Rather, the protruded insertion section 40 is axially positioned by abutting the abutment surface 401 of the flange portion 402, which has a larger area than the end surface 400e of the shaft portion 400, on the stopper surface 20 of the fixing member 1. In this case, a favorable stopper function can be obtained between the abutment surface 401 and the stopper surface 20. If a reference positioning part is the end surface 400e of the thin shaft portion 400, the end of the shaft portion 400 is likely to be deformed by scoring upon positioning. However, because the flange portion 402, which has the larger area than the end surface 400e of the shaft portion 400, is abutted in this embodiment, the deformation of the shaft portion 400 caused by scoring can be prevented.

As described above, the protruded insertion section 40 of the fluid supply valve 4 is removably fitted and attached to the recessed fitting section 17 of the fixing member 1. For the above attachment (see FIG. 4), the inclined surface 451 of the tapered portion 450 provides a guiding function in the radial direction (the arrow R direction). Then, the reference outer peripheral surface 403 of the guided shaft portion 400 in the protruded insertion section 40 abuts on or approaches the reference inner peripheral surface 19 of the recessed fitting section 17. Accordingly, the position of the protruded insertion section 40 of the fluid supply valve 4 is restrained in the radial direction (the arrow R direction) (the first restraint state).

When the external thread 62 of the protruded insertion section 40 is threaded into the internal thread 18 of the recessed fitting section 17, the position of the protruded insertion section 40 is restrained in the radial direction (the arrow R direction) (the second restraint state).

If the second restraint state is prioritized over the first restraint state, the external thread 62 of the protruded insertion section 40 is threaded into the internal thread 18 of the recessed fitting section 17. Meanwhile, the reference outer peripheral surface 403 of the shaft portion 400 in the protruded insertion section 40 forcibly abuts on the reference inner peripheral surface 19 of the recessed fitting section 17; therefore, "scoring" may occur between the reference outer peripheral surface 403 and the reference inner peripheral surface 19. Furthermore, in order to prevent hydrogen brittleness, the recessed fitting section 17 and the protruded insertion section 40 are made of metal (metal with resistance to hydrogen brittleness) such as aluminum alloy and stainless steel (SUS304 and SUS316, for example) and thus are relatively soft. Therefore, there is possible occurrence of the above-mentioned "scoring".

Regarding this matter, as described above, the first restraint state is prioritized over the second restraint state in this embodiment. For this reason, the clearance a2 between the internal thread 18 of the recessed fitting section 17 and the external thread 62 of the protruded insertion section 40 (see FIG. 4) is set relatively large so as to be equal to or larger than 90 micrometers or 100 micrometers. Consequently, the clearance a2 is set close to the maximum allowable value or a value close to the maximum allowable value of the clearance between the internal thread 18 of the recessed fitting section 17 and the external thread 62 of the protruded insertion section 40. Clearance a1 that is formed between the reference inner peripheral surface 19 and the reference outer peripheral surface 403 in the radial direction is set smaller than the clearance a2.

As a result, the second restraint state is not prioritized, but the first restraint state is prioritized over the second restraint state. In other words, the reference outer peripheral surface 403 of the shaft portion 400 of the protruded insertion section 40 abuts on the reference inner peripheral surface 19 of the recessed fitting section 17, thereby preferentially restraining the position of the protruded insertion section 40 in the radial direction (the arrow R direction). Therefore, in contrast to the related art, "scoring" between the reference outer peripheral surface 403 of the shaft portion 400 and the reference inner peripheral surface 19 of the recessed fitting section 17 is effectively prevented. Consequently, "fixation by scoring" can be prevented effectively. Furthermore, even when the shaft portion 400 and the recessed fitting section 17 are made of relatively soft metal such as aluminum alloy and stainless steel, "scoring" and "fixation by scoring" can be prevented effectively.

Figure 4:
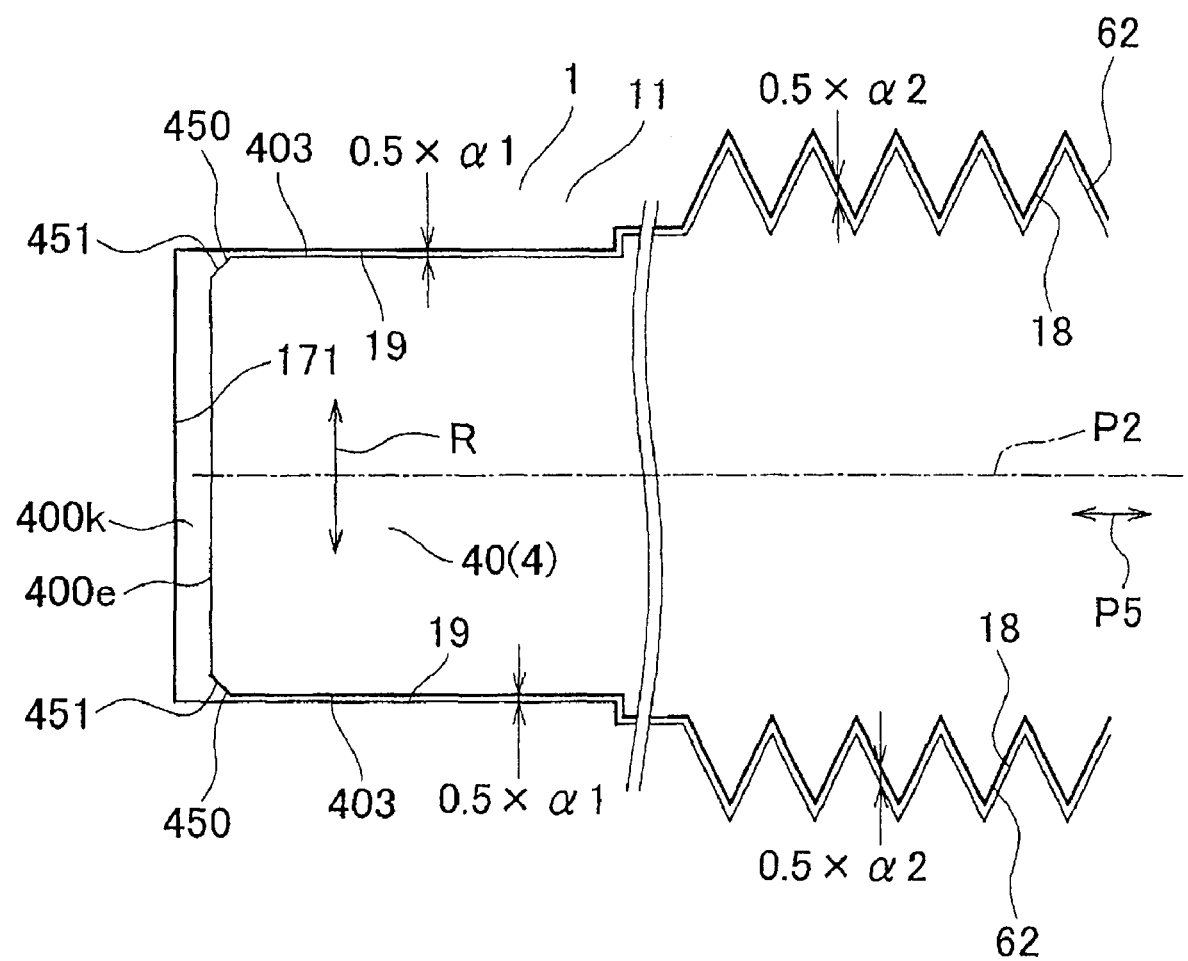
FIG. 4 is a schematic sectional view of clearance a1 that is radially formed between a reference inner peripheral surface and a reference outer peripheral surface and clearance a2 that is diametrically formed between an internal thread and an external thread.

According to this embodiment, in FIG. 4, the clearance formed between the reference inner peripheral surface 19 and the reference outer peripheral surface 403 in the radial direction is set to be a1, and the clearance between the internal thread 18 and the external thread 62 in the radial direction is set to be a2. Offset of the axis of the external thread 62 with respect to the axis of the reference outer peripheral surface 403 in the radial direction is set to be $\beta$. In such a case, the following equation (3) is satisfied.

When the protruded insertion section 40 of the fluid supply valve 4 is fitted to the recessed fitting section 17, as shown in FIG. 4, the total clearance in both sides between the reference inner peripheral surface 19 and the reference outer peripheral surface 403 in the radial direction becomes a1, and the clearance in one side in the radial direction becomes 0.5×a1. In the same state, the total clearance in both sides between the internal thread 18 and the external thread 62 in the radial direction becomes a2, and the clearance in one side in the radial direction becomes 0.5×a2.

In order to fit the protruded insertion section 40 of the fluid supply valve 4 to the recessed fitting section 17, in consideration of the fact that the axis P2 of the protruded insertion section 40 of the fluid supply valve 4 is inclined relative to the axis P1 of the recessed fitting section 17 while the protruded insertion section 40 is fitted to the recessed fitting section 17, it is preferable that a relation expressed in equation (1) be satisfied. Upon expansion of the above conditions, equation (2) and equation (3) are derived.

$$0.5 \times a1 + 0.5 \times a2 > \beta \quad (1),$$

$$a2 > (2\beta - a1) \quad (2),$$

$$a2 > \{(2\beta - a1) \times N\} \quad (3)$$

where N is any value equal to or larger than 1.00 and exemplified within a range that N=1.00 to 3.00, a range that N=1.00 to 1.50, or a range that N=1.00 to 1.20. As N increases, the clearance a2 that is formed between the internal thread 18 and the external thread 62 becomes large, and thus threaded restraint of the external thread 62 by the internal thread 18 becomes loose. Therefore, the first restraint state is prioritized over the second restraint state.

It is preferable that the clearance a1 be set small for sealing properties of a second sealing member 65. Therefore, according to this embodiment, it is set such that the clearance a1=16 to 45 micrometers when the nominal diameter of the external thread 62 is 14 mm and the pitch thereof is 1 mm. However, the dimensions are not limited to the above values. For example, the pitch can be set within a range of 0.1 to 10 mm or a range of 1 to 7 mm as necessary. Referring to equation (3), a2 is set larger when a1 is set smaller.

Figure 5:
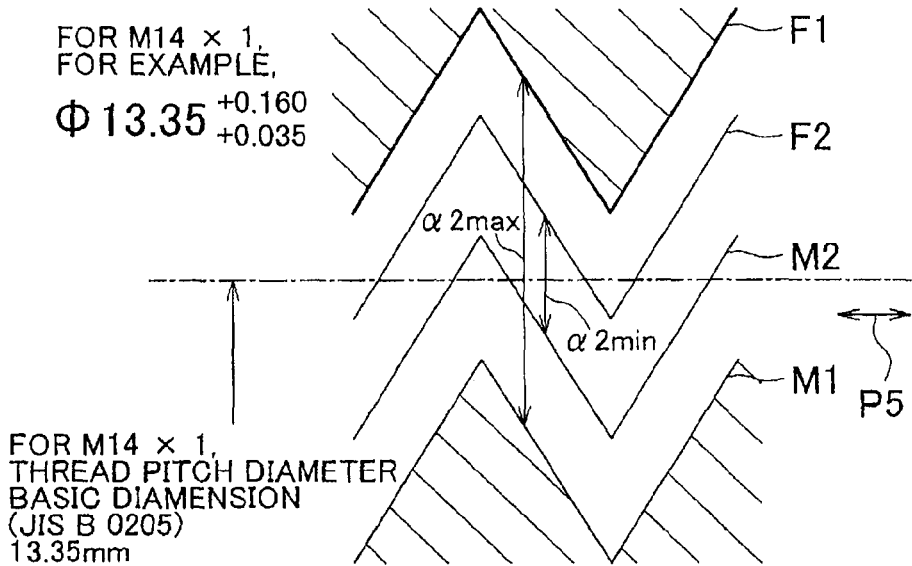
FIG. 5 is a schematic view illustrating the clearance a2 that is formed between the internal thread and the external thread.

A further description will be made of the clearance a2 that is formed between the internal thread 18 and the external thread 62 with reference to FIG. 5. A line M1 in FIG. 5 schematically illustrates a case where the outside diameter of the external thread 62 is the smallest. A line M2 schematically illustrates a case where the outside diameter of the external thread 62 is the largest. A line F1 schematically illustrates a case where the bore diameter of the internal thread 18 is the largest. A line F2 schematically illustrates a case where the bore diameter of the internal thread 18 is the smallest.

As shown in FIG. 5, the basic dimension of the internal thread 18 is set as A, the upper dimensional tolerance thereof is set as B, and the lower dimensional tolerance thereof is set as C. Meanwhile, the basic dimension of the external thread 62 is set as "a", the upper dimensional tolerance thereof is set as "b", and the lower dimensional tolerance thereof is set as "c". The maximum value $a2_{max}$ of the clearance a2 formed between the internal thread 18 and the external thread 62, and the minimum value $a2_{min}$ thereof are expressed as follows. The maximum value of a2: $a2_{max}=(A-a)+(B-c)$. The minimum value of a2: $a2_{min}=(A-a)+(C-b)$. Now, a description will be made with an example in which the nominal diameter of the external thread 62 is 14 mm. In this case, as shown in FIG. 5, it is exemplified as follows: basic dimension A (of the pitch diameter of the internal thread 18)=13.35 mm, the upper dimensional tolerance B (of the internal thread 18)=+0.160 mm, and the lower dimensional tolerance C=0.035 mm. As for the external thread 62, it is exemplified as follows: basic dimension "a"=13.35 mm, the upper dimensional tolerance "b"=−0.069 mm, and the lower dimensional tolerance "c"−0.144 mm.

Here, the maximum value $a2_{max}$ of the clearance a2 formed between the internal thread 18 and the external thread 62 is calculated as follows: $a2_{max}=(A-a)+(B-c)=(13.35$ mm−13.35 mm)+(+0.160 mm−(−0.144 mm))=0.304 mm=304 micrometers.

In contrast, the minimum value $a2_{min}$ of the clearance a2 is calculated as follows: $a2_{min}=(A-a)+(C-b)=(13.35$ mm−13.35 mm)+(0.035 mm−(−0.069 mm))=0.104 mm=104 micrometers. Therefore, in this case, the clearance a2 is equal to or larger than 104 micrometers and thus set within a range of 304 to 104 micrometers.

Figure 7:
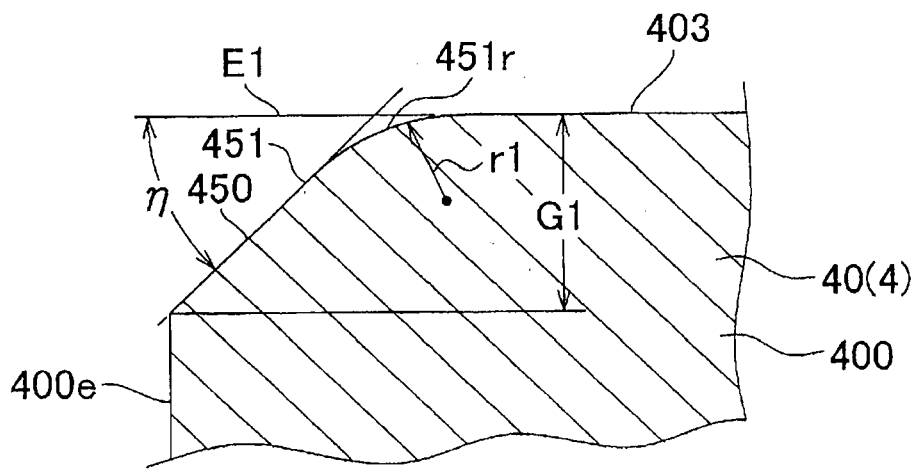
FIG. 7 is a further enlarged cross-sectional view of the vicinity of the tapered portion of the protruded insertion section.

Next, the guiding function based on the conical tapered portion 450 will be described with reference to FIG. 6 and FIG. 7. FIG. 6 and FIG. 7 show the cross section along the axis P2 of the protruded insertion section 40. In order to enhance the guiding function based on the tapered portion 450 in the radial direction, it is preferable that a difference between the maximum diameter and the minimum diameter on the inclined surface 451 of the tapered portion 450 be large. For the above reason, in this embodiment, as shown in FIG. 6 and FIG. 7, when an angle between the inclined surface 451 of the tapered portion 450 and an imaginary line E1 that is parallel with the axis P2 of the protruded insertion section 40 and extends from the reference outer peripheral surface to the bottom surface of the recessed fitting section is defined as a tilt angle η, the tilt angle η is set equal to or larger than 40° and, more specifically, set to be large within a range of 45° to 70° or further within a range of 55° to 70°. Consequently, it is possible to increase the difference between the maximum diameter and the minimum diameter on the inclined surface 451 of the tapered portion 450. Thus, a guiding width G1 on the inclined surface 451 of the tapered portion 450 can be increased while the guiding function of the tapered portion 450 in the diametrical direction (the arrow R direction) can be enhanced. Therefore, the external thread 62 can favorably be threaded into the internal thread 18.

In order to prevent mechanical damages, etc. on the protruded insertion section 40 and the recessed fitting section 17 upon insertion of the protruded insertion section 40 in the recessed fitting section 17, it is preferable that the reference outer peripheral surface 403 of the protruded insertion section 40 gently contacts the reference inner peripheral surface 19 of the recessed fitting section 17. Thus, according to this embodiment, as shown in FIG. 6 and FIG. 7, a part of the tapered portion 450 that has the largest outer diameter is set as a convex rounded surface 451r with a curvature radius r1. Consequently, when the protruded insertion section 40 of the fluid supply valve 4 approaches the bottom of the recessed fitting section 17 of the fixing member 1, it is possible to reduce an impact of the abutment in the radial direction (the arrow R direction) as much as possible. In other words, the tapered portion 450 facilitates gentle contact of the reference outer peripheral surface 403 of the protruded insertion section 40 with the reference inner peripheral surface 19 of the recessed fitting section 17 and to restrain the protruded insertion section 40 in the radial direction. Furthermore, the tapered portion 450 facilitates securement of the sealing property of the second sealing member 65 with the reduced clearance a1 and prevention of mechanical damages, etc. on the reference outer peripheral surface 403 and the reference inner peripheral surface 19.

According to this embodiment, at the beginning of restraint of the tapered portion 450 by the reference inner peripheral surface 19, the external thread 62 has not yet been threaded into the internal thread 18. Following the tapered portion 450, after the reference outer peripheral surface 403 is radially restrained by the reference inner peripheral surface 19 to a certain degree, the external thread 62 begins to be threaded into the internal thread 18. In other words, in the axial direction of the protruded insertion section 40, the length from the end surface 400e of the protruded insertion section 40 to a part of the external thread 62 that is the closest from the end surface 400e is set sufficiently longer than the length from the stopper surface 20 that is located on the other side of the fixing member 1 in the axial direction to a part of the internal thread 18 that is the farthest from the stopper surface 20. More specifically, the length from a thread ridge of the external thread 62 that is the farthest from the flange portion 402 in the axial direction of the protruded insertion section 40 to a part of the reference outer peripheral surface 403 that is the closest to the end surface 400e is set sufficiently longer than the length from a thread ridge of the internal thread 18 that is the farthest from the stopper surface 20 in the axial direction of the fixing member 1 to the stopper surface 20. Thus, the reference outer peripheral surface 403 abuts on the reference inner peripheral surface 19 before the external thread 62 is threaded into the internal thread 18. Accordingly, after completion of the axial positioning between the protruded insertion section 40 and the recessed fitting section 17 by abutment of the reference outer peripheral surface 403 on the reference inner peripheral surface 19, the external thread 62 begins to be threaded into the internal thread 18. Therefore, it is possible to substantially reduce the occurrence of "scoring".

As described above, according to this embodiment, the protruded insertion section 40 of the fluid supply valve 4 is fitted to the recessed fitting section 17 of the fixing member 1 by threading the external thread 62 of the protruded insertion section 40 of the fluid supply valve 4 into the internal thread 18 of the recessed fitting section 17 of the fixing member 1. In this case, according to this embodiment, as described above, the first restraint state is prioritized over the second restraint state when the position of the protruded insertion section 40 of the fluid supply valve 4 is restrained in its radial direction (the arrow R direction). The criteria for the first restraint state are the outer diameter of the reference outer peripheral surface 403 and the inner diameter of the reference inner peripheral surface 19. A ring-shaped second sealing groove 406 is coaxially formed in the reference outer peripheral surface 403. The ring-shaped second sealing member 65 made of a sealing material is arranged in the second sealing groove 406. In a state where the second sealing member 65 is sealing, the second sealing member 65 enhances its sealing property by elastic deformation. As described above, according to this embodiment, the second sealing member 65 is provided in the reference outer peripheral surface 403 of the protruded insertion section 40 that is a criterion for the first restraint state. This facilitates the uniform elastic deformation of the second sealing member 65 in the radial direction (the arrow R direction). Consequently, this favorably prevents deviation in the elastic deformation of the second sealing member 65. Therefore, it is possible to effectively increase the sealing property of the second sealing member 65.

Figure 8:
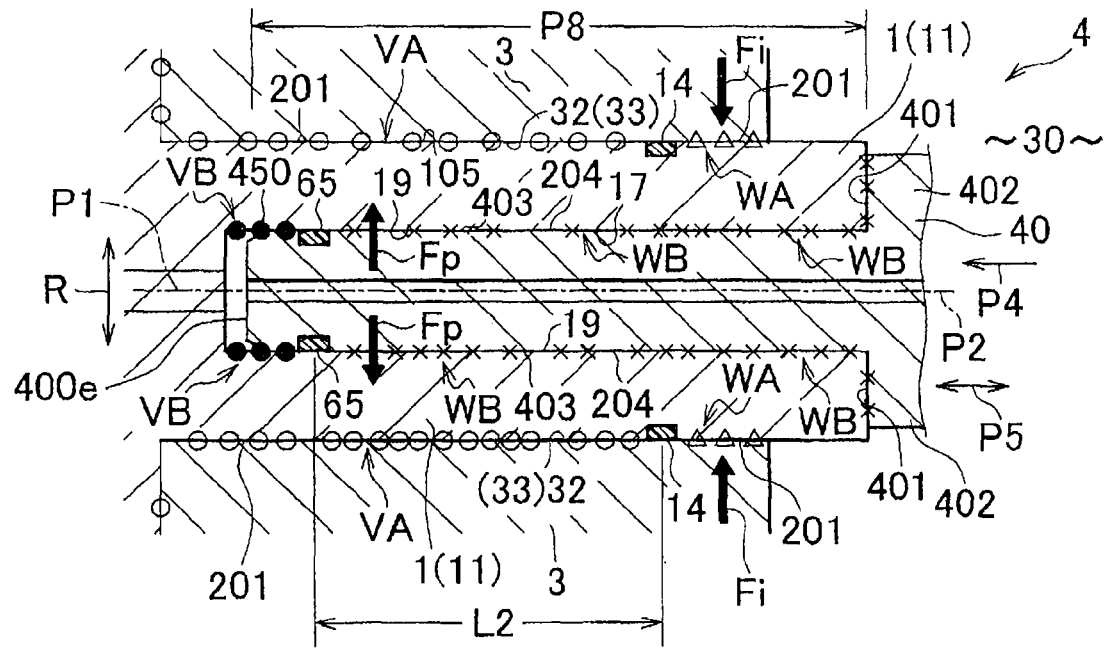
FIG. 8 is a schematic sectional view showing a state according to a reference example where the protruded insertion section is fitted to the recessed fitting section.

FIG. 8 shows a reference example with a similar structure as one in this embodiment. The components that are used in common with this embodiment are denoted by the same numerals. In FIG. 8, it is assumed that a structure to increase a distance P8 from the abutment surface 401 of the flange portion 402 to the end surface 400e of the tapered portion 450 is adopted in a direction P5 in which the axis P2 of the protruded insertion section 40 extends. In such a case, even if the axis P2 of the protruded insertion section 40 is slightly inclined relative to the axis P1 of the fixing member 1 upon attachment of the fluid supply valve 4, the deviation of the end surface 400e of the protruded insertion section 40 increases in the radial direction (the arrow R direction). This is unsuited for improvement of attachment accuracy of the fluid supply valve 4. Therefore, a "shortening structure" that shortens the distance P8 from the abutment surface 401 of the flange portion 402 to the end surface 400e of the tapered portion 450 is adopted in this embodiment.

In this embodiment, as described above, the first sealing member 14 is arranged between the outer periphery of the fixing member 1 and the inner periphery of the mounting hole 32 of the tank 3 as shown in FIG. 1. In the direction P5 in which the axis P2 of the protruded insertion section 40 extends, the first sealing member 14 is arranged in a position closer to the tank chamber 30 than a position outside the tank 3 at ambient atmosphere W. Furthermore, as shown in FIG. 2 and FIG. 3, the second sealing member 65 is close to the first sealing member 14 in the extending direction P5. This is advantageous to obtain the "shortening structure" as described above. Here, a distance between the center of the first sealing member 14 and the center of the second sealing member 65 is indicated as L1 (see FIG. 2 and FIG. 3). The distance L1 is shorter than the diameter of the reference outer peripheral surface 403 and furthermore shorter than the radius thereof. Therefore, in this embodiment, the distance from the abutment surface 401 of the flange portion 402 to the end surface 400e of the tapered portion 450 in the extending direction P5 can be shortened as much as possible. This is advantageous to improve the attachment accuracy of the fluid supply valve 4.

An additional description will now be made with reference to FIG. 8 as a reference diagram. Even when the fluid supply valve 4 is closed, the high-pressure gas (hydrogen gas) in the tank chamber 30 enters clearance 201 between the inner periphery of the mounting hole 32 of the tank 3 and the outer periphery of the fixing member 1. In other words, it is considered that the high-pressure gas in the clearance 201 enters an area WA that is closer to the tank chamber 30 side than the first sealing member 14 (an area indicated by triangles in the clearance 201). However, it is considered that even gas can not easily pass through the first sealing member 14 in the arrow P4 direction. Accordingly, it is considered that an area VA in the clearance 201 that is farther away from the tank chamber 30 than the first sealing member 14 in the arrow P4 direction (an area indicated by ○ in the clearance 201) is at atmospheric pressure.

The high-pressure gas (hydrogen gas) in the tank chamber 30 also enters clearance 204 between the reference inner peripheral surface 19 and the reference outer peripheral surface 403. At this time, it is considered that the high-pressure gas enters an area WB in the clearance 204 that is closer to the tank chamber 30 side than the second sealing member 65 (an area indicated by x in the clearance 204). However, it is considered that even gas cannot easily pass through the second sealing member 65 in the arrow P4 direction. Accordingly, it is considered that pressure of an area VB in the clearance 204 that is farther away from the tank chamber 30 than the second sealing member 65 in the arrow P4 direction (an area indicated by • in the clearance 204) is closer to atmospheric pressure than the pressure of the area WB.

For adoption of the above-mentioned shortening structure, it is preferable that the first sealing member 14 and the second sealing member 65 be closer to the tank chamber 30 side relative to ambient atmosphere in the extending direction P5. If, as shown in FIG. 8, the second sealing member 65 is located farther away from the tank chamber 30 while the first sealing member 14 is located close to the tank chamber 30, the following problem occurs.

More specifically, in the area WA (the area indicated by triangles) of the clearance 201, force produced by the high-pressure gas, which has entered therein, acts on the first section 11 of the fixing member 1 in the arrow Fi direction (the radial shortening direction). Meanwhile, in the area WB (the area indicated by x) of the clearance 204, force produced by the high-pressure gas, which has entered therein, acts on the first section 11 of the fixing member 1 in the arrow Fp direction (the radial expansion direction).

If the first sealing member 14 is located in the same position as the second sealing member 65 in the extending direction P5, there is an increase in the rate at which the force in the arrow Fi direction and the force in the arrow Fp direction, which are in opposite directions, cancel each other. Consequently, unnecessary load that acts on the first section 11 of the fixing member 1 is reduced.

On the contrary, as shown in the reference diagram of FIG. 8, when the first sealing member 14 is spaced apart from the second sealing member 65 by a distance L2 in the extending direction P5, an area in the first section 11 of the fixing member 1 on which only the force in the arrow Fp direction acts increases. The area where only the force in the arrow Fp direction acts is an area within the distance L2. As described above, as a result of the action of the force only in the arrow Fp direction, the unnecessary load that acts on the first section 11 of the fixing member 1 in the radial expansion direction increases. In this case, because the gas in the tank chamber 30 is at high pressure as described above, the above-mentioned load is substantial. Therefore, it may cause deformation or fatigue of the first section 11 of the fixing member 1 or may provide an unexpected load on the first sealing member 14 and the second sealing member 65.

Considering the above problem, according to this embodiment, the first sealing member 14 is arranged close to the second sealing member 65 in the extending direction P5, as shown in FIG. 2 and FIG. 3. Here, the distance between the center of the first sealing member 14 and the center of the second sealing member 65 is indicated as L1 (see FIG. 2, L1<L2). The distance L1 is shorter than the diameter of the reference outer peripheral surface 403 and further shorter than the radius thereof. According to this embodiment, unlike the reference example shown in FIG. 8, there is an increase in the rate at which the force in the arrow Fi direction and the force in the arrow Fp direction cancel each other. Therefore, it is possible to reduce a chance of the deformation or fatigue of the first section 11 of the fixing member 1 or of the unexpected load that acts on the first sealing member 14 and the second sealing member 65.

Second Embodiment

Figure 9:
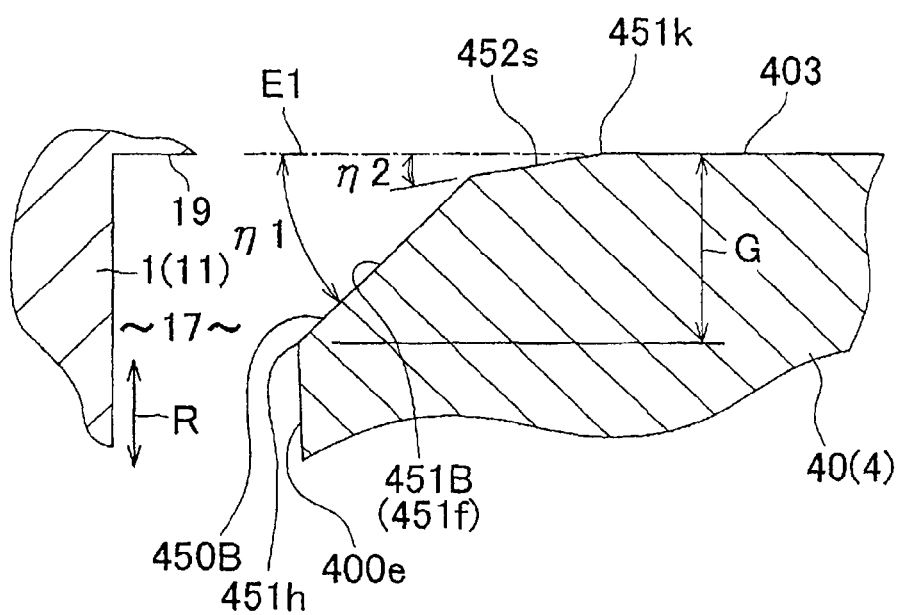
FIG. 9 is an enlarged sectional view of the vicinity of the tapered portion of the protruded insertion section according to a second embodiment.

FIG. 9 illustrates a second embodiment. This embodiment basically possesses the same configuration and effects as the first embodiment. Thus, a description is now made with its focus on the differences. FIG. 9 shows the cross section along the axis P2 of the protruded insertion section 40 in the fluid supply valve 4. As described above, the protruded insertion section 40 is inserted in the recessed fitting section 17 by threading the external thread 62 into the internal thread 18. In such a case, in order to prevent damages, etc. on the protruded insertion section 40 and the recessed fitting section 17, it is preferable that the reference outer peripheral surface 403 of the protruded insertion section 40 be abutted on the reference inner peripheral surface 19 of the recessed fitting section 17 as gently as possible in the radial direction (the arrow R direction).

As shown in FIG. 9, an inclined angle is set between an inclined surface 451B of a tapered portion 450B and an imaginary line E1 that is in parallel with the axis P2 of the protruded insertion section 40 and extends from the reference outer peripheral surface to the bottom surface of the recessed fitting section. A part with a small diameter in the inclined surface 451B of the tapered portion 450B is set as a start point 451h. A part with a large diameter in the inclined surface 451B of the tapered portion 450B is set as a termination point 451k. At this time, an inclined angle η1 on the start point 451h side of the inclined surface 451B of the tapered portion 450B is set larger than an inclined angle η2 on the termination point 451k side of the inclined surface 451B of the tapered portion 450B. It is exemplified that η1 is equal to or less than 45°. Meanwhile, η2 is exemplified to be equal to or less than 15°.

In other words, as shown in FIG. 9, the inclined surface 451B of the tapered portion 450B has: a ring-shaped first inclined surface 451f with the relatively large inclined angle η1; and a ring-shaped second inclined surface 452s with the relatively small inclined angle η2 (η1>η2). Therefore, when the protruded insertion section 40 is inserted into the bottom of the recessed fitting section 17 by threading the external thread 62 into the internal thread 18, it is possible to increase a guiding dimension G by the first inclined surface 451B of the tapered portion 450 and also possible to abut the reference outer peripheral surface 403 on the reference inner peripheral surface 19 as gently as possible while a guiding function in the radial direction by the inclined surface 451 is enhanced.

Third Embodiment

This embodiment basically has the configuration that is common with the first embodiment, and thus FIG. 1 to FIG. 7 are also used in this embodiment. The effects of this embodiment are also the same as those of the first embodiment except that the axial positioning of the reference outer peripheral surface 403 in the radial direction is made by the reference inner peripheral surface 19 prior to threading of the external thread 62 into the internal thread 18. Thus, a description is now made with its focus on the differences. According to the above-mentioned first embodiment, at the beginning of restraint of the reference outer peripheral surface 403 by the reference inner peripheral surface 19, threading of the external thread 62 into the internal thread 18 has not yet been started. After the reference outer peripheral surface 403 is radially restrained by the reference inner peripheral surface 19 to a certain degree, the external thread 62 begins to be threaded into the internal thread 18. On the contrary, in this embodiment, first, threading of the external thread 62 into the internal thread 18 is started. Then, after the reference outer peripheral surface 403 is diametrically positioned to a certain degree, the tapered portion 450 and the reference outer peripheral surface 403 are restrained by the reference inner peripheral surface 19. In other words, in the axial direction of the protruded insertion section 40, the length from the end surface 400e of the protruded insertion section 40 to a part of the external thread 62 that is the closest to the end surface 400e is set shorter than the length from the stopper surface 20 that is located on the other side of the fixing member 1 in the axial direction to a part of the internal thread 18 that is the farthest from the stopper surface 20. More specifically, in the axial direction of the protruded insertion section 40, the length from a thread ridge of the external thread 62 that is the farthest from the flange portion 402 to a part of the reference outer peripheral surface 403 that is the closest to the end surface 400e is set shorter than the length from a thread ridge of the internal thread 18 that is the farthest from the stopper surface 20 to the stopper surface 20 in the axial direction of the fixing member 1. In this embodiment, the first constraint state is also prioritized over the second constraint state; however, the clearance between the external thread 62 and the internal thread 18 upon threading of the external thread 62 into the internal thread 18 is set larger than that in the first embodiment.

Other Embodiment

The nominal diameter, the outside diameter, and the root diameter of the external thread 62 are not limited to the above numerical values, and they can be changed according to the types of the fixing member 1 and the fluid supply valve 4. As described above, the nominal diameter of the external thread 62 is not limited to the above values and can be any value within a range of 0.99 to 355 mm. In this case, if the pitch of the external thread 62 is from 0.2 to 8 mm, the dimension of the clearance a2 can be exemplified from 6 to 1,840 micrometers in accordance with the nominal diameter of the external thread 62. In the above-mentioned embodiments, the tank 3 stores the high-pressure hydrogen gas. However, the gas may be hydrocarbon fuel gas such as methane gas that can be reformer fuel for the fuel cell. In addition, if a reformer is provided in the fuel cell, the gas may be purge gas such as argon gas and nitrogen gas to purge the inside of the reformer. Furthermore, the gas may be another high-pressure gas such as cathode gas including oxygen gas. Each of the above-mentioned embodiments is applied to the fuel cell system; however, the application of the embodiments is not limited thereto. The above-mentioned embodiments are also applicable to other systems. The present invention is not limited to the above-mentioned embodiments that are illustrated in the respective figures, and can be changed accordingly without departing from the scope thereof. Configuration and function particular to an embodiment can be applied to other embodiments.

The present invention can be used for the fuel cell system. Such fuel cell system is for, for example, vehicles, fixed equipment, industrial purposes, electrical equipment, and so forth.

What is claimed is:

1. A fluid supply valve attachment device comprising:
   a fixing member that includes a first passage through which fluid passes, a recessed fitting section that is provided with a bottom surface at an end in an axial direction, an internal thread that is formed on the inner periphery of the recessed fitting section, a reference inner peripheral surface that is formed on the inner periphery of the recessed fitting section between the internal thread and the bottom surface; and
   a fluid supply valve that includes a second passage whose one end communicates with the first passage of the fixing member and whose other end communicates with a fuel supply source, a valve body that opens or closes the second passage, a protruded insertion section that is inserted in and attached to the recessed fitting section, an external thread that is provided on the protruded insertion section and is threaded into the internal thread of the recessed fitting section, and a reference outer peripheral surface that is fitted to the reference inner peripheral surface of the fixing member,
   wherein clearance between the reference outer peripheral surface and the reference inner peripheral surface when the reference outer peripheral surface is fitted to the reference inner peripheral surface is set smaller than clearance between the external thread and the internal thread when the external thread is threaded into the internal thread.

2. A fluid supply valve attachment device comprising:
   a fixing member that includes a first passage through which fluid passes, a recessed fitting section that is provided with a bottom surface at an end in an axial direction, an internal thread that is formed on the inner periphery of the recessed fitting section, a reference inner peripheral surface that is formed on the inner periphery of the recessed fitting section between the internal thread and the bottom surface; and
   a fluid supply valve that includes a second passage whose one end communicates with the first passage of the fixing member and whose other end communicates with a fuel supply source, a valve body that opens or closes the second passage, a protruded insertion section that is inserted in and attached to the recessed fitting section, an external thread that is provided on the protruded insertion section and is threaded into the internal thread of the recessed fitting section and a reference outer peripheral surface that is fitted to the reference inner peripheral surface of the fixing member, wherein clearance between the reference outer peripheral surface and the reference inner peripheral surface when the reference outer peripheral surface is fitted to the reference inner peripheral surface is set smaller than clearance between the external thread and the internal thread when the external thread is threaded into the internal thread, and a tapered portion whose outer diameter is reduced as it approaches a tip thereof is formed at an end of the protruded insertion section of the fluid supply valve.

3. The fluid supply valve attachment device according to claim 2, wherein in a cross section along an axis of the protruded insertion section, a part of the tapered portion whose diameter is the largest is in a rounded shape.

4. The fluid supply valve attachment device according to claim 2, wherein in the cross section along the axis of the protruded insertion section, in a case that an angle between an inclined surface of the tapered portion and an imaginary line that is in parallel with the axis of the protruded insertion section and extends from the reference outer peripheral surface to a bottom surface of the recessed fitting section is defined as an inclined angle, that a part of the inclined surface with a small diameter is defined as a start point, and that a part of the inclined surface with a large diameter is defined as a termination point, an inclined angle at the start point of the inclined surface is set larger than an inclined angle at the termination point of the inclined surface.

5. The fluid supply valve attachment device according to claim 4, wherein the inclined surface includes a first inclined surface that is provided in a part near the start point and a second inclined surface that is provided in a part near the termination point.

6. A fluid supply valve attachment device comprising:

a fixing member that includes a first passage through which fluid passes, a recessed fitting section that is provided with a bottom surface at an end in an axial direction, an internal thread that is formed on the inner periphery of the recessed fitting section, a reference inner peripheral surface that is formed on the inner periphery of the recessed fitting section between the internal thread and the bottom surface; and a fluid supply valve that includes a second passage whose one end communicates with the first passage of the fixing member and whose other end communicates with a fuel supply source, a valve body that opens or closes the second passage, a protruded insertion section that is inserted in and attached to the recessed fitting section, an external thread that is provided on the protruded insertion section and is threaded into the internal thread of the recessed fitting section, and a reference outer peripheral surface that is fitted to the reference inner peripheral surface of the fixing member, wherein clearance between the reference outer peripheral surface and the reference inner peripheral surface when the reference outer peripheral surface is fitted to the reference inner peripheral surface is set smaller than clearance between the external thread and the internal thread when the external thread is threaded into the internal thread, the fixing member has a ring-shaped stopper surface that extends from an other end opposite, in the axial direction, to the one end at which the bottom surface of the recessed fitting section is provided, to the outside in a radial direction, and the protruded insertion section of the fluid supply valve includes a shaft portion that has the external thread on its outer periphery, and a flange portion that extends from a base end of the shaft portion to the outside in the radial direction and that has a ring-shaped abutment surface that abuts on the stopper surface of the fixing member when the external thread is threaded into the internal thread.

7. The fluid supply valve attachment device according to claim 6, wherein:

clearance is formed between the tip of the protruded insertion section and the bottom surface of the recessed fitting section in a state that the protruded insertion section is inserted in the recessed fitting section and that the abutment surface abuts on the stopper surface.

8. The fluid supply valve attachment device according to claim 1, wherein the fixing member is mounted to a tank that has a tank chamber for storing fluid.

9. The fluid supply valve attachment device according to claim 1, wherein when the protruded insertion section is inserted in the recessed fitting section, the external thread is threaded into the internal thread after the reference outer peripheral surface is radially restrained by the reference inner peripheral surface.

10. The fluid supply valve attachment device according to claim 1, wherein length of the protruded insertion section in the axial direction from the tip of the protruded insertion section to the external thread is set longer than length between an other end opposite, in the axial direction, to the one end at which the bottom surface of the recessed fitting section is provided and a part of the internal thread that is farthest from the other end.

11. The fluid supply valve attachment device according to claim 1, further comprising an annular sealing member that is retained between the reference outer peripheral surface and the reference inner peripheral surface.

12. The fluid supply valve attachment device according to claim 1, wherein the recessed fitting section and the protruded insertion section are made of metal with resistance to hydrogen brittleness.

13. The fluid supply valve attachment device according to claim 12, wherein the recessed fitting section and the protruded insertion section are made of aluminum alloy or stainless steel.

14. The fluid supply valve attachment device according to claim 1, wherein the protruded insertion section and the recessed fitting section are fitted to satisfy the following expression:

$$0.5 \times a1 + 0.5 \times a2 > \beta,$$

where a1 is the clearance between the reference outer peripheral surface and the reference inner peripheral surface when the reference outer peripheral surface is fitted to the reference inner peripheral surface, a2 is the clearance between the external thread and the internal thread when the external thread is threaded into the internal thread, and β is an offset of an axis of the external thread with respect to an axis of the reference outer peripheral surface in a radial direction.

* * * * *